(12) United States Patent
Teramura et al.

(10) Patent No.: US 8,223,002 B2
(45) Date of Patent: Jul. 17, 2012

(54) ELECTRONIC CONTROL APPARATUS WITH AUTOMATIC INFORMATION UPDATE WHEN TRANSFERRED BETWEEN VEHICLES

(75) Inventors: Mikio Teramura, Okazaki (JP); Takeo Umesaka, Gifu (JP)

(73) Assignee: Denso Corporation, Kariya (JP)

( * ) Notice: Subject to any disclaimer, the term of this patent is extended or adjusted under 35 U.S.C. 154(b) by 564 days.

(21) Appl. No.: 12/427,209

(22) Filed: Apr. 21, 2009

(65) Prior Publication Data

US 2009/0267733 A1    Oct. 29, 2009

(51) Int. Cl.
*B60R 25/04* (2006.01)

(52) U.S. Cl. .................. 340/426.11; 180/287; 307/10.3; 307/10.5; 701/1; 701/36

(58) Field of Classification Search .......... 307/9.1, 307/10.1–10.6; 327/141–142; 340/426.11–426.15, 340/426.35–426.36; 700/2; 701/1, 32–36, 701/48, 102

See application file for complete search history.

(56) References Cited

U.S. PATENT DOCUMENTS

| | | | | |
|---|---|---|---|---|
| 5,394,327 A * | 2/1995 | Simon et al. | | 701/1 |
| 5,521,588 A * | 5/1996 | Kuhner et al. | | 340/12.28 |
| 6,107,695 A * | 8/2000 | Denz et al. | | 307/10.5 |
| 6,151,530 A | 11/2000 | Ino | | |
| 6,546,321 B1 * | 4/2003 | Ohkubo | | 701/35 |
| 7,151,325 B2 * | 12/2006 | Matsubara et al. | | 307/10.6 |
| 2001/0002814 A1 * | 6/2001 | Suganuma et al. | | 340/5.74 |
| 2005/0187674 A1 * | 8/2005 | Ando | | 701/1 |
| 2005/0222718 A1 * | 10/2005 | Lazarz et al. | | 701/1 |
| 2005/0256614 A1 * | 11/2005 | Habermas | | 701/1 |
| 2006/0066150 A1 * | 3/2006 | Kiuchi et al. | | 307/10.3 |
| 2006/0197381 A1 | 9/2006 | Yoshimura et al. | | |
| 2008/0255718 A1 * | 10/2008 | Tuff | | 701/29 |

FOREIGN PATENT DOCUMENTS

| | | |
|---|---|---|
| JP | 07-093676 | 4/1995 |
| JP | 10-247103 | 9/1998 |
| JP | 2000-108848 | 4/2000 |
| JP | 2000-259420 | 9/2000 |
| JP | 2001-301572 | 10/2001 |
| JP | 2006-031416 | 2/2006 |
| JP | 2006-240566 | 9/2006 |

OTHER PUBLICATIONS

Title 13, California Code Regulations, Section §1968.2, Malfunction and Diagnostic System Requirements for 2004 and Subsequent Model-Year Passenger Cars, Light-Duty Trucks, and Medium-Duty Vehicles and Engines (OBD II), pp. i-iii and 1-143, No Date.
Japanese Office Action dated Feb. 23, 2010, issued in corresponding Japanese Application No. 2008112628, with English translation.

* cited by examiner

*Primary Examiner* — Benjamin C Lee
*Assistant Examiner* — Stephen Burgdorf
(74) *Attorney, Agent, or Firm* — Nixon & Vanderhye P.C.

(57) ABSTRACT

Disclosed is an electronic control apparatus for a vehicle which includes: 1) first storage means for storing vehicle identification information unique to the vehicle; 2) second storage means for storing immobilizer identification information unique to the vehicle; 3) command receiving means for receiving, from an external control apparatus, an update command that commands the electronic control apparatus to update the vehicle identification information stored in the first storage means; and 4) information handling means for handling all the information stored in the first and second storage means. Moreover, in the electronic control apparatus, upon receipt of the update command by the command receiving means, the information handling means updates the immobilizer identification information stored in the second storage means as well as the vehicle identification information stored in the first storage means.

5 Claims, 2 Drawing Sheets

ELECTRONIC CONTROL APPARATUS WITH AUTOMATIC INFORMATION UPDATE WHEN TRANSFERRED BETWEEN VEHICLES

CROSS-REFERENCE TO RELATED APPLICATION

This application is based on and claims priority from Japanese Patent Application No. 2008-112628, filed on Apr. 23, 2008, the content of which is hereby incorporated by reference in its entirety into this application.

BACKGROUND OF THE INVENTION

1. Technical Field of the Invention

The present invention relates to an electronic control apparatus for vehicles which updates, upon being transferred from one vehicle to another, vehicle identification information stored in the apparatus.

2. Description of the Related Art

Conventionally, for example as disclosed in Japanese Patent First Publication No. 2001-301572, an engine ECU (Electronic Control Unit) for a motor vehicle has a VIN (Vehicle Identification Number) stored in a memory (e.g., an EEPROM) thereof; the VIN is unique to the vehicle.

Moreover, in addition to the VIN, the engine ECU also has stored in the memory thereof immobilizer identification information, various types of diagnostic information, and learning values for control of the vehicle. Here, the immobilizer identification information denotes information which is unique to the vehicle or a valid user (or users) of the vehicle and is used to identify whether a user intending to activate the vehicle is the valid user.

More specifically, upon detection of immobilizer identification information from a portable device (e.g., an ignition key) of the user intending to activate the vehicle, the engine ECU or an immobilizer ECU of the vehicle crosschecks the detected immobilizer identification information against the immobilizer identification information stored in the memory. When the detected identification information coincides or matches with the immobilizer identification information stored in the memory, the engine ECU or the immobilize ECU identifies the user intending to activate the vehicle as the valid user and allows the identified user to activate the engine of the vehicle.

Furthermore, when the engine ECU is removed from the vehicle and installed to a new vehicle, it is necessary to update the VIN stored in the memory with the VIN of the new vehicle. This is because without updating the VIN stored in the memory of the engine ECU, the new vehicle cannot pass the motor vehicle inspection conducted by the government.

In addition, future OBD-related regulations will probably stipulate that all emission-related diagnostic information stored in the engine ECU be erased when updating the VIN stored in the memory of the engine ECU. Here, OBD stands for On-Board Diagnostics.

Moreover, it is preferable that other information stored in the engine ECU than the VIN and emission-related information be updated along with the VIN. It is further preferable to minimize the man-hours needed to update the information other than the VIN and emission-related information.

SUMMARY OF THE INVENTION

The present invention has been made in view of the above-mentioned problems.

The inventors of the present invention have focused their attention on the immobilizer identification information as the information to be preferably updated along with the VIN. This is because when the immobilizer identification information stored in the engine ECU is not updated and thus different from the immobilizer identification information of the new vehicle, the valid user of the new vehicle may be unable to activate the new vehicle. Accordingly, the inventors have come to consider that when updating the VIN, it is preferable to update the immobilizer identification information stored in the engine ECU with that of the new vehicle.

According to the present invention, there is provided an electronic control apparatus for a vehicle. The apparatus includes: 1) first storage means for storing vehicle identification information unique to the vehicle; 2) second storage means for storing immobilizer identification information unique to the vehicle; 3) command receiving means for receiving, from an external control apparatus, an update command that commands the electronic control apparatus to update the vehicle identification information stored in the first storage means; and 4) information handling means for handling all the information stored in the first and second storage means. Moreover, in the apparatus, upon receipt of the update command by the command receiving means, the information handling means updates the immobilizer identification information stored in the second storage means as well as the vehicle identification information stored in the first storage means.

With the above configuration, the apparatus can update both the vehicle identification information stored in the first storage means and the immobilizer identification information stored in the second storage means only upon receipt of the single update command. Consequently, compared to the case of updating the vehicle identification information and immobilizer identification information by issuing two separate update commands, the necessary man-hours can be reduced.

Preferably, in the electronic control apparatus, upon receipt of the update command by the command receiving means, the information handling means performs a single information handling process to update both the vehicle identification information stored in the first storage means and the immobilizer identification information stored in the second storage means.

With the above configuration, the necessary man-hours for updating both the vehicle identification information and the immobilizer identification information can be further reduced in comparison of the case of updating them by performing two separate updating processes.

Preferably, the electronic control apparatus further includes information acquiring means for acquiring immobilizer identification information from another electronic control apparatus that is installed in the same vehicle as the electronic control apparatus. The information handling means updates the immobilizer identification information stored in the second storage means with the immobilizer identification information acquired by the information acquiring means.

Preferably, the electronic control apparatus further includes third storage means for storing learning values for control of the vehicle. In the information handling process, the information handling means further initializes the learning values stored in the third storage means to default values.

Preferably, upon receipt of the update command by the command receiving means, the information handling means automatically performs the information handling process without communicating with the external control apparatus. Alternatively, the information handling means may automatically perform, while communicating with the external control apparatus, the information handling process without any human intervention.

Preferably, in the information handling process, the information handling means first updates the vehicle identification information stored in the first storage means and then updates the immobilizer identification information stored in the second storage means. When it fails to successfully update the vehicle identification information stored in the first storage means, the information handling means refrains from further updating the immobilizer identification information stored in the second storage means.

Preferably, the electronic control apparatus further includes fourth storage means for storing emission-related diagnostic information on the vehicle. In the information handling process, the information handling means further erases the emission-related diagnostic information from the fourth storage means.

The electronic control apparatus may be an ECU (Electronic Control Unit) for controlling an engine of the vehicle.

The vehicle identification information may be a vehicle identification number of the vehicle.

The first and second storage means may be made up of a common nonvolatile memory. Further, the nonvolatile memory may be an EEPROM.

The electronic control apparatus may also be so configured that: upon receipt of the update command by the command receiving means, the information handling means performs a first update process to update the vehicle identification information stored in the first storage means; and upon completion of the first update process, the information handling means performs a second update process to update the immobilizer identification information stored in the second storage means.

BRIEF DESCRIPTION OF THE DRAWINGS

The present invention will be understood more fully from the detailed description given hereinafter and from the accompanying drawings of one preferred embodiment of the invention, which, however, should not be taken to limit the invention to the specific embodiment but are for the purpose of explanation and understanding only.

In the accompanying drawings.

DESCRIPTION OF PREFERRED EMBODIMENT

Figure 1:
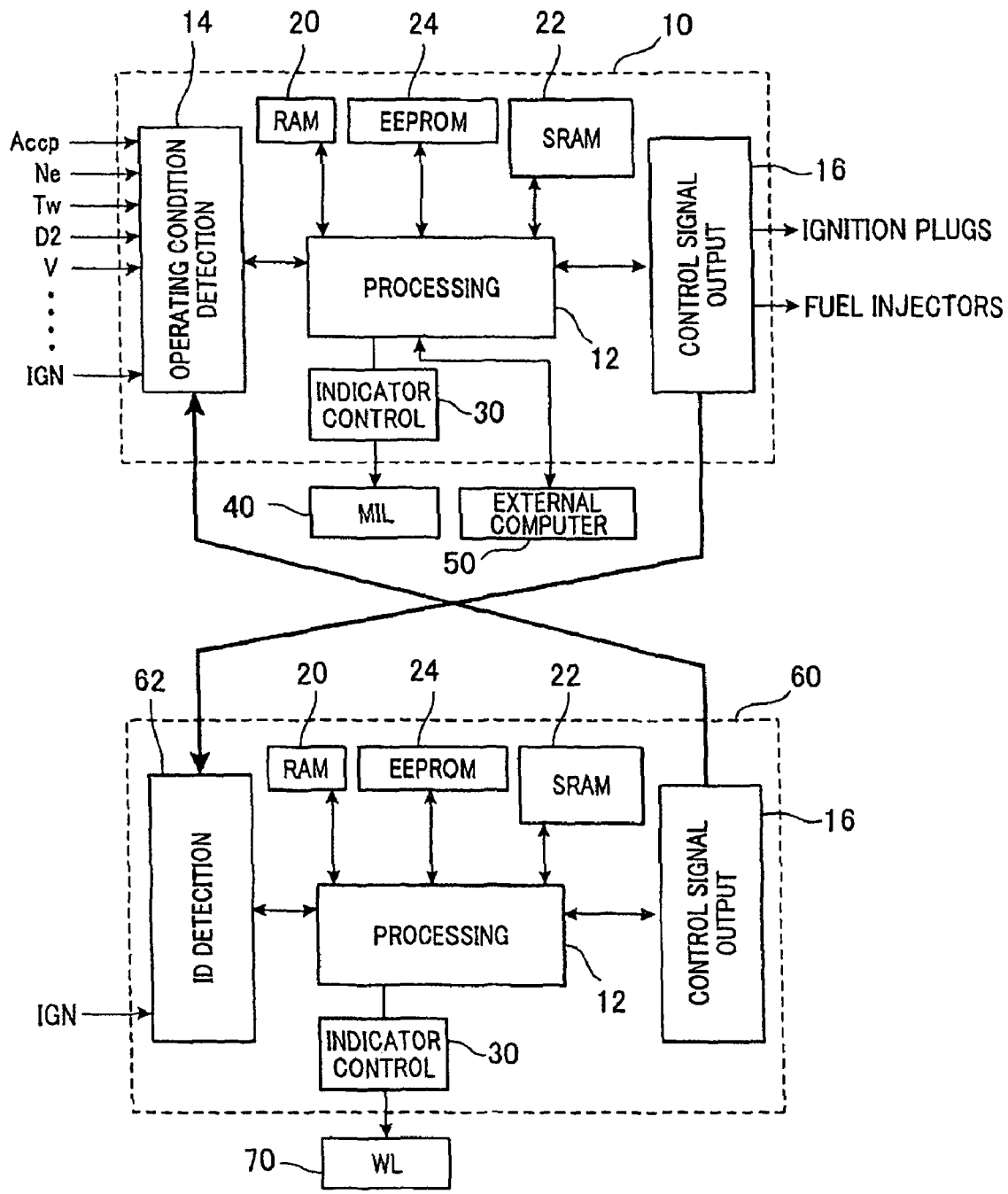
FIG. 1 is a functional block diagram showing a vehicle control system according to the preferred embodiment of the invention.

FIG. 1 shows a vehicle control system according to a preferred embodiment of the invention.

As shown in FIG. 1, the vehicle control system includes an engine ECU 10 and an immobilizer ECU 60, which communicate with each other via an on-board network, for example a CAN (Controller Area Network).

The engine ECU 10 is designed to control the engine of the vehicle to operate in a desired operating condition. The engine ECU 10 is configured with, for example, input and output circuits, a microcomputer and its peripheral circuits, input and output terminals, a case or housing, and holding members. The engine ECU 10 is installed, for example, in the passenger compartment or engine compartment of the vehicle.

Functionally, the engine ECU 10 includes a processing block 12, an operating condition detection block 14, a control signal output block 16, a RAM 20, a SRAM 22, an EEPROM 24, and an indicator control block 30.

The processing block 12 is configured with hardware which includes a CPU, a timer, and a ROM. To control the engine to operate in a desired operating condition, the processing block 12 first computes the values of various parameters based on the output signals of various sensors which are provided by the operating condition detection block 14; then, based on the computed values of the parameters, the processing block 12 controls various actuators through the control signal output block 16. Moreover, the processing block 12 also performs a self-diagnosis function to detect malfunctions of components of the vehicle.

The operating condition detection block 14 receives the output signals of the various sensors which together represent the current operating condition of the engine. The output signals may include, for example, an accelerator position signal (indicated by ACCP in FIG. 1) output from an accelerator position sensor, an engine speed signal (indicated by Ne in FIG. 1) output from an engine speed sensor, a cooling water temperature signal (indicated by Tw in FIG. 1) output from a water temperature sensor, an oxygen concentration signal (indicated by O2 in FIG. 1) output from an oxygen sensor, an intake air flow signal (indicated by V in FIG. 1) output from an intake air flow sensor, and an ignition signal (indicated by IGN in FIG. 1) output from an ignition switch.

The control signal output block 16 outputs control signals provided by the processing block 12 to the various actuators, causing the actuators to operate in accordance with the control signals to make the engine operate in a desired operating condition. The actuators may include, for example, ignition plugs and fuel injectors.

The RAM 20 temporarily stores the results of computation by the processing block 12. The SRAM (Standby RAM) 22 is a volatile memory that is always supplied with electric power by a battery of the vehicle even when the ignition switch is turned off. In this sense, the SRAM 22 is also referred to as power-backed up RAM. The EEPROM 24 is an Electrically Erasable Programmable Read-Only Memory.

For example, upon detection of malfunctions of emission-related components of the vehicle, the processing block 12 first stores DTCs (Diagnostic Trouble Codes) indicative of the detected malfunctions into the SRAM 22. Then, among the DTCs indicative of the detected malfunctions, the processing block 12 selects those which are identical to predetermined DTCs and stores the selected DTCs into the EEPROM 24 as PDTCs (Permanent DTCs) during the ignition cycle (i.e., the time period from the turning on to the turning off of the ignition switch or the time period from the turning on to the next turning on of the ignition switch). Here, the emission-related components of the vehicle may include sensors necessary for emission control of the engine, such as the water temperature sensor for sensing the temperature of cooling water of the engine and the intake air flow sensor for sensing the flow of intake air into the engine. In addition, the California Air Resources Board (CARB) proposes that DTCs indicative of detected malfunctions of components of vehicles be stored as PDTCs into nonvolatile memories such as an EEPROM.

The EEPROM 24 stores a VIN (Vehicle Identification Number) unique to the vehicle, an immobilizer ID unique to the vehicle or a valid user (or users) of the vehicle, and learning values for control of the vehicle. The learning values stored in the EEPROM 24 may include, for example, those for learning the performance characteristics of the fuel injectors and throttle valve of the engine. In addition, it is stipulated by regulations that the VIN be stored in a nonvolatile memory.

As above, in the engine ECU 10 according to the present embodiment, the EEPROM 24 functions as means for storing vehicle identification information unique to the vehicle, immobilizer identification information unique to the vehicle or the valid user (or users) of the vehicle, and the learning values for control of the vehicle. Moreover, both the SRAM 22 and the EEPROM 24 function as means for storing diagnostic information.

The indicator control block 30 controls the Malfunction Indicator Lamp (MIL) 40 to indicate the detected malfunctions of the components of the vehicle.

An external computer 50 is, as an external control apparatus, connected to the engine ECU 10 via an input/output interface (not shown). The external computer 50 reads the various types of information stored in the SRAM 22 and EEPROM 24 by communicating with the engine ECU 10. Moreover, the external computer 50 commands the engine ECU 10 to update the various types of information stored in the SRAM 22 and EEPROM 24.

The immobilizer ECU 60 has almost the same configuration as the engine ECU 10. Therefore, identical blocks having substantially identical functions in the engine ECU 10 and immobilizer ECU 60 are assigned to the same reference numerals.

Functionally, the immobilizer ECU 60 includes an ID detection block 62 that detects an immobilizer ID from an ignition key of a user intending to activate the vehicle. On the other hand, the EEPROM 24 of the immobilizer ECU 60 has an immobilizer ID stored therein. The processing block 12 of the immobilizer ECU 60 checks whether the immobilizer ID detected by the ID detection block 62 is identical to the immobilizer ID stored in the EEPROM 24 of the immobilizer ECU 60. When the two IDs are identical to each other, the processing block 12 identifies the user intending to activate the vehicle as the valid user of the vehicle; otherwise, the processing block 12 identifies the user as an invalid user. After identifying the user, the processing block 12 encodes the identification results and sends to the engine ECU 10 the encoded identification results along with the immobilizer ID stored in the EEPROM 24 of the immobilizer ECU 60.

When the identification results sent from the immobilizer ECU 60 indicates that the user is invalid, the engine ECU 10 does not start the engine. Moreover, when the identification results indicates that the user is valid but the immobilizer ID sent from the immobilizer ECU 60 is different from that stored in the EEPROM 24 of the engine ECU 10, the engine ECU 10 also does not start the engine. The engine ECU 10 starts the engine only when the identification results indicates that the user is valid and the immobilizer ID sent from the immobilizer ECU 60 is identical to that stored in the EEPROM 24 of the engine ECU 10.

In addition, when the user intending to activate the vehicle is identified as invalid, the indicator control block 30 of the immobilizer ECU 60 illuminates a Warning Lamp (WL) 70.

After having described the overall configuration of the vehicle control system according to the present embodiment, functions of the engine ECU 10 will be described hereinafter.

In the present embodiment, the engine ECU 10 performs the functions by executing programs installed in the ROM of the engine ECU 10.

[Function of Receiving VIN Update Command]

Figure 2:
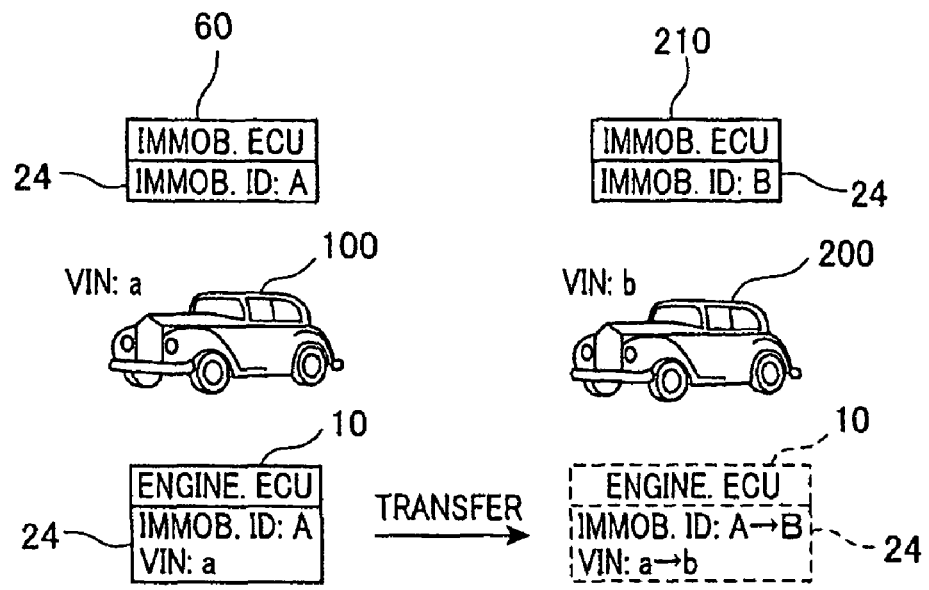
FIG. 2 is a schematic view illustrating the transfer of an engine ECU according to the preferred embodiment from one vehicle to another.

Referring to FIG. 2, when the engine ECU 10 is removed from the vehicle 100 and installed to another vehicle 200, it is necessary to update the VIN a of the vehicle 100 stored in the EEPROM 24 of the engine ECU 10 with the VIN b of the vehicle 200.

To this end, the engine ECU 10 receives, from the external computer 50, a VIN update command that commands the engine ECU 10 to update the VIN a of the vehicle 100 stored in EEPROM 24 with the VIN b of the vehicle 200.

[Function of Acquiring Immobilizer ID]

After receipt of the VIN update command, the engine ECU 10 acquires the immobilizer ID B of the vehicle 200 from the immobilizer ECU 210 of the vehicle 200.

More specifically, the engine ECU 10 sends a request signal to the immobilizer ECU 210 of the vehicle 200; upon receipt of the request signal, the immobilizer ECU 210 sends the immobilizer ID B of the vehicle 200 to the engine ECU 10.

[Function of Handling Information]

The engine ECU 10 first updates the VIN a of the vehicle 100 stored in the EEPROM 24 of the engine ECU 10 with the VIN b of the vehicle 200 sent from the external computer 50.

Further, the engine ECU 10 erases the DTCs from the SRAM 22 and PDTCs from the EEPROM 24.

Moreover, the engine ECU 10 initializes the learning values stored in the EEPROM 24 to default values which are determined by averaging learning values for different vehicles. In addition, the learning values may also be updated with other predetermined values.

Furthermore, the engine ECU 10 updates the immobilizer ID A of the vehicle 100 stored in the EEPROM 24 of the engine ECU 10 with the immobilizer ID B of the vehicle 200 acquired from the immobilizer ECU 210 of the vehicle 200.

In the present embodiment, upon receipt of the VIN update command sent from the external computer 50, the engine ECU 10 automatically updates the VIN and immobilizer ID, erases the DTCs and PDTCs, and initializes the learning values without communicating with the external computer 50. Moreover, when it fails to successfully update the VIN, the engine ECU 10 refrains from further performing the remaining tasks and informs the external computer 50 of the failure in updating the VIN. Consequently, the immobilizer ID and the learning values can be prevented from being updated with or initialized to erroneous values.

Figure 3:
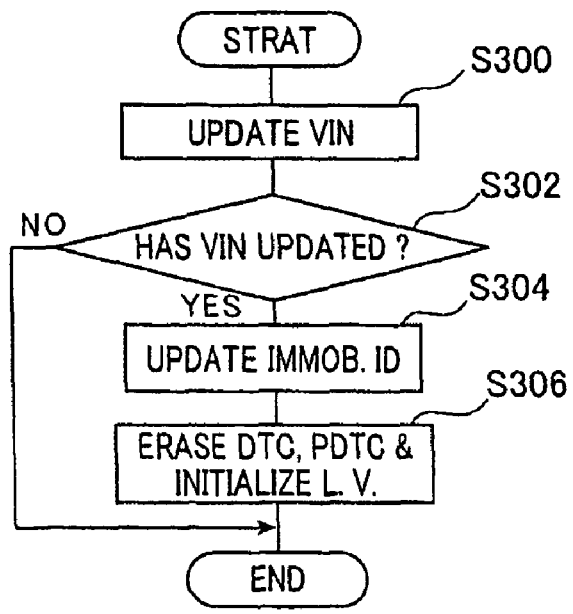
FIG. 3 is a flow chart illustrating an information handling process of the engine ECU according to the preferred embodiment.

FIG. 3 shows an information handling process of the engine ECU 10 according to the present embodiment. The engine ECU 10 performs this process upon being transferred one vehicle (e.g., the vehicle 100) to another (e.g., the vehicle 200).

More specifically, after the transfer of the engine ECU 10 from the vehicle 100 to the vehicle 200, the external computer 50 sends the VIN update command to the engine ECU 10; upon receipt of the VIN update command, the engine ECU 10 starts to perform the information handling process. In addition, the engine ECU 10 may or may not send to the external computer 50 an acknowledge signal for acknowledging safe receipt of the VIN update command.

First, in step S300, the engine ECU 10 updates the VIN a of the vehicle 100 stored in the EEPROM 24 of the engine ECU 10 with the VIN b of the vehicle 200.

In addition, in the case of the engine ECU 10 sending the acknowledge signal, the external computer 50 may send the VIN b of the vehicle 200 to the engine ECU 10 upon receipt of the acknowledge signal. Otherwise, the external computer 50 may send the VIN b of the vehicle 200 to the engine ECU 10 together with the VIN update command.

In step S302, the engine ECU 10 checks whether the VIN a of the vehicle 100 has been successfully updated in the EEPROM 24 of the engine ECU 10 with the VIN b of the vehicle 200.

If the check in step S302 results in a "NO" answer, then the process directly goes to the end without further performing the remaining tasks.

In addition, in this case, the engine ECU 10 may also try again the updating of the VIN a with the VIN b. Moreover, when the updating of the VIN a with the VIN b is still unsuccessful after being tried more than predetermined times, the engine ECU 10 may diagnose the EEPROM 24 as malfunctioning and inform the external computer 50 of the malfunction of the EEPROM 24. As a result, one may take necessary measures, for example replacing the EEPROM 24 with a new one.

On the other hand, if the check in step S302 results in a "YES" answer, then the process proceeds to step S304.

In step S304, the engine ECU 10 acquires the immobilizer ID B of the vehicle 200 from the immobilizer ECU 210 of the vehicle 200, and updates the immobilizer ID A of the vehicle 100 stored in the EEPROM 24 of the engine ECU 10 with the immobilizer ID B.

In succeeding step S306, the engine ECU 10 erases the DTCs from the SRAM 22 and the PDTCs from the EEPROM 24 of the engine ECU 10, and initializes the Learning Values (L.V.) stored in the EEPROM 24 of the engine ECU 10 to the default values. After that, the process goes to the end.

The above-described engine ECU 10 according to the present embodiment has the following advantages.

In the present embodiment, upon receipt of the VIN update command from the external computer 50, the engine ECU 10 updates the immobilizer ID A of the vehicle 100 stored in the EEPROM 24 with the immobilizer ID B of the vehicle 200 as well as updates the VIN a of the vehicle 100 stored in the EEPROM 24 with the VIN b of the vehicle 200. In other words, the engine ECU 10 updates both the VIN a and immobilizer ID A of the vehicle 100 stored in the EEPROM 24 of the engine ECU 10 only upon receipt of the single VIN update command from the external computer 50.

Consequently, compared to the case of updating the VIN a and immobilizer ID A of the vehicle 100 with the VIN b and immobilizer ID B of the vehicle 200 by issuing two separate update commands by the external computer 50, the man-hours needed to update them can be reduced.

Moreover, in the present embodiment, upon receipt of the VIN update command from the external computer 50, the engine ECU 10 performs the single information handling process to both update the VIN a of the vehicle 100 stored in the EEPROM 24 with the VIN b of the vehicle 200 and update the immobilizer ID A of the vehicle 100 stored in the EEPROM 24 with the immobilizer ID B of the vehicle 200.

Consequently, compared to the case of updating the VIN a and immobilizer ID A of the vehicle 100 with the VIN b and immobilizer ID B of the vehicle 200 by performing two separate update processes, the manhours needed to update them can be further reduced.

In the present embodiment, the engine ECU 10 acquires the immobilizer ID B of the vehicle 200 from the immobilizer ECU 210 that is installed in the same vehicle 200 as the engine ECU 10.

Consequently, the engine ECU 10 can easily and reliably acquire the immobilizer ID B of the vehicle 200.

In the present embodiment, the engine ECU 10 initializes, in the information handling process, the learning values stored in the EEPROM 24 to default values which are determined by averaging learning values for different vehicles.

Consequently, compared to the case of not initializing the learning values, it is possible to reduce the time required to obtain learning values suitable for control of the vehicle 200.

In the present embodiment, upon receipt of the VIN update command from the external computer 50, the engine ECU 10 automatically performs the information handling process without communicating with the external computer 50.

Consequently, the engine ECU 10 can speedily handle all the information stored therein.

In the present embodiment, when it fails to successfully update the VIN a of the vehicle 100 in the EEPROM 24 with the VIN b of the vehicle 200, the engine ECU 10 refrains from further updating the immobilizer ID a of the vehicle 100 with the immobilizer ID B of the vehicle 200 and initializing the learning values to the default values.

Consequently, the immobilizer ID a of the vehicle 100 and the learning values can be prevented from being updated with or initialized to erroneous values.

In the present embodiment, the engine ECU 10 erases, in the information handling process, the DTCs from the SRAM 22 and the PDTCs from the EEPROM 24.

Consequently, compared to the case of performing the tasks of updating the VIN a of the vehicle 100 and erasing the DTCs and PDTCs by performing two different processes, the man-hours needed to complete the tasks can be reduced.

While the above particular embodiment of the invention has been shown and described, it will be understood by those skilled in the art that various modifications, changes, and improvements may be made without departing from the spirit of the invention.

For example, in the previous embodiment, the engine ECU 10 automatically performs the information handling process without communicating with the external computer 50.

However, the engine ECU 10 may also automatically perform the information handling process, while communicating with the external computer 50, without any human intervention. In this case, it is still possible for the engine ECU 10 to speedily handle all the information stored therein.

Moreover, in the previous embodiment, in the information handling process, the engine ECU 10 updates the VIN and immobilizer ID, erases the DTCs and PDTCs, and initializes the learning values for control of the vehicle 100 to the default values.

However, in addition to the above tasks, the engine ECU 10 may further update, erase, or initialize other information unique to the vehicle 100 in the information handling process.

In the previous embodiment, the immobilizer ID and learning values are stored in the same memory (i.e., the EEPROM 24) as the VIN.

However, the immobilizer ID and learning values may also be stored in a different memory from the VIN. For example, the engine ECU 10 may be further equipped with an auxiliary power source, and the SRAM 22 may be powered by the auxiliary power source when the engine ECU 10 is removed from the vehicle 100. In this case, the immobilizer ID and learning values may be stored in the SRAM 22 instead of the EEPROM 24.

In the previous embodiment, the engine ECU 10 acquires the immobilizer ID B of the vehicle 200 from the immobilizer ECU 210 of the vehicle 200.

However, it is also possible for the engine ECU 10 to acquire the immobilizer ID B of the vehicle 200 from any other ECU of the vehicle 200 which has the immobilizer ID B stored therein. Further, it is also possible for the engine ECU 10 to acquire the immobilizer ID B of the vehicle 200 from a portable device (e.g., an ignition key) of a valid user of the vehicle 200.

Furthermore, there may be a case where the engine ECU 10 has transmitted a request signal to another ECU of the vehicle 200 or an external device such as a portable device, but there is no immobilizer ID B transmitted to the engine ECU 10 within a predetermined time from the transmission of the request signal or after a plurality of times of the transmission of the request signal. In such a case, in step S304 of the information handling process shown in FIG. 3, the engine ECU 10 may initialize the immobilizer ID A of the vehicle 100 in the EEPROM 24 to a default immobilizer ID. Further, in next starting the engine (or at the start of the next ignition cycle of the engine), if it is checked out that the default immobilizer ID is stored in the EEPROM 24, then the engine ECU 10 may acquire the immobilizer ID B of the vehicle 200 from the another ECU or the external device and rewrite the default immobilizer ID in the EEPROM 24 with the acquired immobilizer ID B of the vehicle 200.

In the previous embodiment, in step S304 of the information handling process, the engine ECU 10 acquires the immobilizer ID B of the vehicle 200 from the immobilizer ECU 210 of the vehicle 200, and updates the immobilizer ID A of the vehicle 100 in the EEPROM 24 of the engine ECU 10 with the immobilizer ID B.

However, in step S304 of the information handling process, the engine ECU 10 may initialize the immobilizer ID A of the vehicle 100 in the EEPROM 24 to a default immobilizer ID without acquiring the immobilizer ID B of the vehicle 200 from the immobilizer ECU 210. Instead, at the start of the next ignition cycle, the engine ECU 10 may send a request signal to the immobilizer ECU 210, receive the immobilizer ID B of the vehicle 200 which is sent by the immobilizer ECU 210 in response to receipt of the request signal, and update the default immobilizer ID in the EEPROM 24 with the received immobilizer ID B.

In the previous embodiment, the functions of the engine ECU 10 are performed by executing the programs installed in the ROM of the engine ECU 10.

However, it is also possible to perform at least one of the functions of the engine ECU 10 by hardware means, for example a dedicated electrical circuit.

In the previous embodiment, upon receipt of the VIN update command from the external computer 50, the engine ECU 10 performs the single information handling process to both update the VIN a of the vehicle 100 stored in the EEPROM 24 with the VIN b of the vehicle 200 and update the immobilizer ID A of the vehicle 100 stored in the EEPROM 24 with the immobilizer ID B of the vehicle 200.

However, the engine ECU 10 may also be so configured that: upon receipt of the VIN update command from the external computer 50, the engine ECU 10 performs the information handing process to only update the VIN a of the vehicle 100 with the VIN b of the vehicle 200; and upon completion of the information handing process, the engine ECU 10 further performs, either consecutively or with a time interval, an update process to update the immobilizer ID A of the vehicle 100 with the immobilizer ID B of the vehicle 200.

What is claimed is:

1. An electronic control apparatus for a vehicle, the apparatus comprising:
   a first storage unit for storing vehicle identification information unique to the vehicle;
   a second storage unit for storing immobilizer identification information unique to the vehicle;
   a command receiving unit for receiving, from an external control apparatus, an update command that commands the electronic control apparatus to update the vehicle identification information stored in the first storage unit;
   an information acquiring unit for acquiring immobilizer identification information from another electronic control apparatus that is installed in the same vehicle as the electronic control apparatus; and
   an information handling unit for handling all the information stored in the first and second storage units, wherein
   upon receipt of the update command by the command receiving unit, the information handling unit updates the vehicle identification information stored in the first storage unit, and initializes the immobilizer identification information stored in the second storage unit to default immobilizer identification information when the information acquiring unit fails to acquire the immobilizer identification information from the another electronic control apparatus, and
   in next starting an engine of the vehicle, when it is checked out that the default immobilizer identification information is stored in the second storage unit, the information acquiring unit acquires the immobilizer identification information from the another electronic control apparatus, and the information handling unit rewrites the default immobilizer identification information in the second storage unit with the immobilizer identification information acquired by the information acquiring unit.

2. The electronic control apparatus as set forth in claim 1, further comprising a third storage unit for storing learning values for control of the vehicle,
   wherein in the information handling process, the information handling unit further initializes the learning values stored in the third storage unit to default values.

3. The electronic control apparatus as set forth in claim 1, wherein upon receipt of the update command by the command receiving unit, the information handling unit automatically performs the information handling process without communicating with the external control apparatus.

4. The electronic control apparatus as set forth in claim 1, wherein upon receipt of the update command by the command receiving unit, the information handling unit automatically performs, while communicating with the external control apparatus, the information handling process without any human intervention.

5. The electronic control apparatus as set forth in claim 1, wherein in the information handling process, the information handling unit first updates the vehicle identification information stored in the first storage unit and then updates the immobilizer identification information stored in the second storage unit, and
   when it fails to successfully update the vehicle identification information stored in the first storage unit, the information handling unit refrains from further updating the immobilizer identification information stored in the second storage unit.

* * * * *

UNITED STATES PATENT AND TRADEMARK OFFICE
CERTIFICATE OF CORRECTION

| | |
|---|---|
| PATENT NO. | : 8,223,002 B2 |
| APPLICATION NO. | : 12/427209 |
| DATED | : July 17, 2012 |
| INVENTOR(S) | : Teramura et al. |

It is certified that error appears in the above-identified patent and that said Letters Patent is hereby corrected as shown below:

Please add the following on the Title page of the patent:

(30)     Foreign Application Priority Data

Apr. 23, 2008    (JP) .......................... 2008-112628

Signed and Sealed this
Twenty-third Day of October, 2012

David J. Kappos
*Director of the United States Patent and Trademark Office*